Oct. 3, 1961 D. ABEL 3,002,679
SPHERICAL COMPUTERS
Filed Aug. 12, 1960 6 Sheets-Sheet 1

Fig. 1.

DONALD ABEL
INVENTOR.

BY *Milo H. Hutchinson*
ATTORNEY.

Oct. 3, 1961

D. ABEL 3,002,679

SPHERICAL COMPUTERS

Filed Aug. 12, 1960

DONALD ABEL
INVENTOR.

BY *Mila H. Hutchinson*
ATTORNEY.

DONALD ABEL
INVENTOR.

ATTORNEY

Oct. 3, 1961 D. ABEL 3,002,679
SPHERICAL COMPUTERS
Filed Aug. 12, 1960 6 Sheets—Sheet 5

DONALD ABEL
INVENTOR.

BY Milo H. Hutchinson
ATTORNEY.

Oct. 3, 1961          D. ABEL          3,002,679
SPHERICAL COMPUTERS
Filed Aug. 12, 1960          6 Sheets—Sheet 6

DONALD ABEL
INVENTOR.

ATTORNEY.

United States Patent Office 3,002,679
Patented Oct. 3, 1961

3,002,679
SPHERICAL COMPUTERS
Donald Abel, 43 Susan Ave., Midland Park, N.J.
Filed Aug. 12, 1960, Ser. No. 49,275
11 Claims. (Cl. 235—61)

This invention relates to spherical computers.

It is an object of the instant invention to provide a device for converting Cartesian coordinates into polar coordinates and to aid in the control of the path and speed of an airplane or missle in flight or a submarine when submerged.

A further object is to provide a device for solving dynamic and static partial differential and integration problems of three or less variable inputs. The readings of the actual path of the resultant through space will give a space curve which is the integral of the three inputs.

An additional object is to provide a device for obtaining the resultant from the X, Y, and Z-factors in the vector diagram of a—c circuits, stresses and strains in a cube of material, and similar mathematical situations.

It is also an object of the instant invention to provide a device for obtaining true distances between points on a Cartesian map, chart, or drawing.

A further object is to provide a device for obtaining continuously changing resultants of the stresses and strains in a structure, proportions of ingredients in physical or chemical processes, etc.

Another object is to provide a device for aiding in the control of specialized machines requiring angular movement in two planes with varying depth of cut.

Other objects of the instant invention will become apparent in the course of the following specification.

In the attainment of the aforesaid objectives, subject computer is made in three embodiments. Except for the resultant length take-off, each embodiment is substantially similar and is constituted in part of main and outer X and Z-carriages; upper and lower Y-carriages; a resultant member; X, Y, and Z-tension members; and driving means for the carriages.

The main X-carriage may be formed from two substantially linear members secured together intermediate the ends thereof at right angles to each other. The two intersected members are supported upright in a casing by two spaced parallel screws.

The outer X-carriage is a linear member held in spaced parallel arrangement with the horizontal member of the main X-carriage by one of the main X-carriage screws and a third screw in spaced parallel arrangement with the other two screws.

Each of the upper and lower Y-carriages is constituted of two linear members secured together at one end at right angles to each other, and are held in spaced parallel position with each other and with the horizontal member of the main X-carriage by two spaced parallel Y-screws threaded through the corresponding ends of each Y-carriage.

Both the main and outer Z-carriages are similar to the corresponding carriages of the main and outer X-carriages, and are held in spaced parallel arrangement with each other on opposite sides of the vertical member of the main X-carriage by Z-screws, the planes of the Z-carriages being perpendicular to the planes of the X-carriages.

Substantially through the center of the theoretical X, Y, and Z-axes is an elevation shaft held by a yoke assembly. A resultant sliding in and out on the shaft will rotate the shaft when elevated or depressed, and constricted in the azimuth movement imparts a rotary movement to the yoke assembly.

X, Y, and Z-tension members between the outer X and Z-carriages and the resultant member shifts that member into various positions.

The invention will appear more clearly from the following detailed description when taken in conjunction with the accompanying drawings showing by way of example the preferred embodiments of the inventive concept.

In the drawings:

FIGURES 1–14 show the first embodiment of the computer constructed in accordance with the principles of this invention, and in which:

FIGURES 2a and 15 show the second embodiment and in which:

FIGURE 15 is an enlarged view in part section of the take-off of the resultant length along the line 15—15 of FIGURE 2a.

FIGURES 2b, 16, and 17 show the third embodiment, and in which:

Referring now to the first embodiment of the computer shown in FIGURES 1-14, reference numeral 20 (FIGS. 1 and 2) indicates the computer.

The computer 20 is constituted in part of a casing 21 which is formed with a top member 22, a bottom member 23, two side members, 26 and 27, and two end members 24 and 25. The members are secured together along corresponding edges and the casing is held upright by legs attached to the bottom member 23 at each corner, three of the legs being indicated by numerals 23a, 23b, and 23c.

Within the casing 21 are the main and outer X-carriages, 28 and 39a, respectively; the upper and lower Y-carriages, 43 and 46; and the main and outer Z-carriages, 58 and 70.

Figure 1:
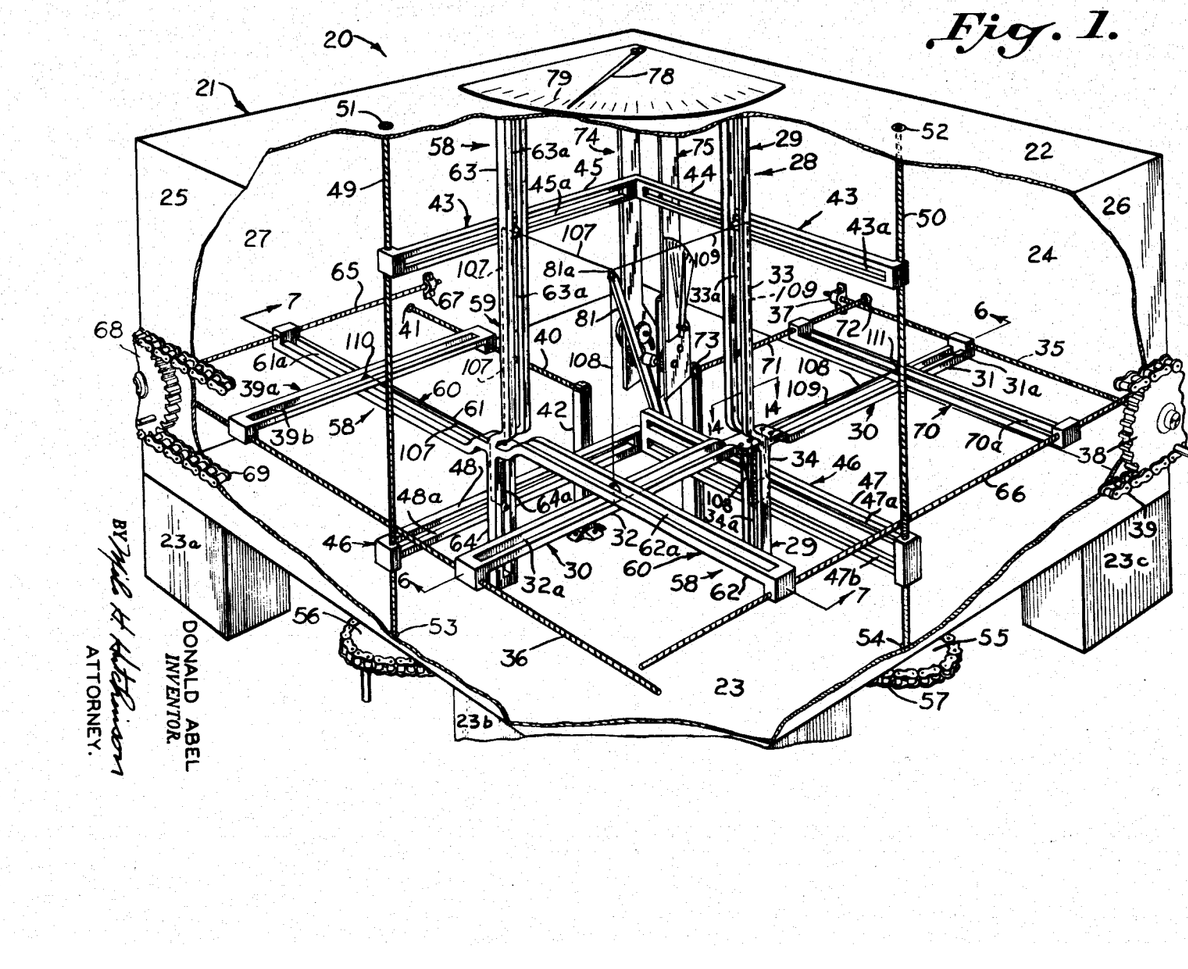
FIGURE 1 is a perspective view of the computer with a portion of the casing broken away to show more clearly the main and outer X and Z-carriages, the upper and lower Y-carriages, the X, Y, and Z-tension members, the yoke assembly, the elevation angle and resultant length indicators, etc.
Figure 12:
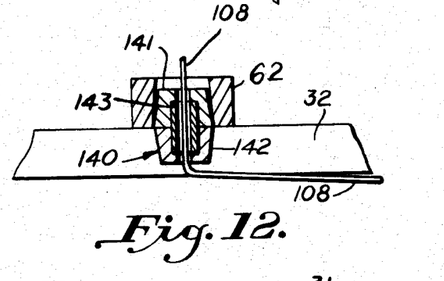
FIGURE 12 is an enlarged side view in part section of an anti-friction device for the tension members where passing through the coinciding longitudinal slots in the main X, upper and lower Y, and main Z-carriages.
Figure 13:
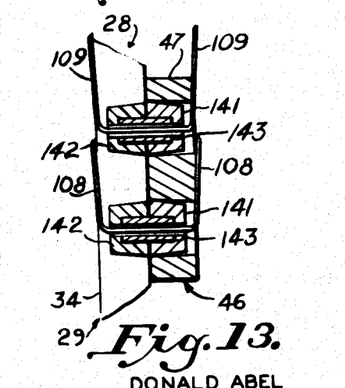
FIGURE 13 is similar to FIGURE 12 but showing double antifriction devices where the two spaced longitudinal slots in the lower Y-carriage coincide with the slot in the lower portion of the vertical member of the main X-carriage.
Figure 14:
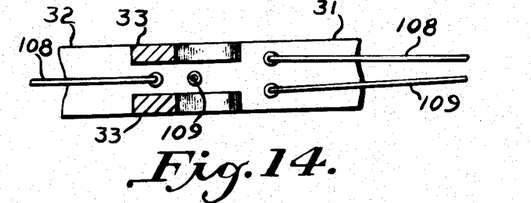
FIGURE 14 is an enlarged fragmentary top view of the intersection of the vertical and horizontal members of the main X-carriage along the line 14—14 of FIGURE 1.

The main X-carriage 28 is formed with a vertical member 29 and a horizontal member 30 which intersect each other, as shown. While not critical but, on the other hand, to facilitate the movement of the later described Y and Z-tension members, 108 and 109, respectively, and to provide for the free rotation of the yoke assembly 74, both the vertical member 29 and the horizontal member 30 of the main X-carriage are curved adjacent their line of intersection as illustrated. By such construction, one portion 31 of the horizontal member 30, at the right in FIGURE 1, is depressed relative to the elevated portion 32 on the opposite side of the line of intersection but both portions are in spaced parallel planes and are interconnected by a curved member as illustrated. Likewise, the upper portion 33 of the vertical member 29 of the main X-carriage, above the line of intersection, is in spaced parallel arrangement with the lower portion 34. As illustrated, the depressed portion 31 of the horizontal member 30 is substantially equal in length to the elevated portion 32, but the upper portion 33 of the vertical member 29 is substantially twice the length of the lower portion 34 because the later described Y and Z-tension members, 108 and 109, respectively, are so looped through the lower portion 34 of the vertical member 29 that there is taken up or released twice the distance that is subtracted or added by the later described upper Y-carriage 43. Both portions of the horizontal and vertical members, 29 and 30, have longitudinal slots, 31a and 32a, and 33a and 34a, respectively, formed therein as illustrated and the slots may be tapered as shown in FIGURES 12 and 13.

The main X-carriage 28 is maintained upright and perpendicular to the bottom member 23 by the spaced parallel X-screws 35 and 36 which, in the case of constant pitch screws, are threaded through the free ends of the horizontal member 30. However, the screws may have a constant or variable pitch but similar to each other and are held in a horizontal plane by substantially similar bearings, one of which is indicated by numeral 37. Of course, if the pitch be variable, a known follower type device is used rather than a female type thread in the ends of the horizontal member 30. One end of the screw 35 is extended through the side member 26 of the casing and on the outwardly extended end is keyed a sprocket wheel 38. Another sprocket wheel (not shown) is keyed to the outwardly extended end of the screw 36 on the same side of the casing. A chain drive 39 between the two sprocket wheels constitutes the X-drive mechanism and will rotate the screws 35 and 36 simultaneously in the same direction for the movement of the main X-carriage. Of course, a gear train, belt drive, etc. could be used in lieu of the chain drive illustrated and described.

The outer X-carriage 39a is constituted of a linear member with a longitudinal slot 39b as shown but the slot need not be tapered as in the case of the slots of the previously illustrated and described main X-carriage 28. One end of the outer X-carriage 39a is supported by the previously mentioned X-screw 36 while the opposite end is supported by another but similar screw 40 in spaced parallel arrangement with the screw 36, both screws being in the same horizontal plane. One end of the screw 40 is held by any suitable bearing 41 in the side member 27 of the casing 21. The opposite end of the screw 40 is held by another bearing (not shown) in a post 42 secured upright on the bottom member 23 of the casing. The thread of the screw 40 is similar to that of the screws 35 and 36, and the screw 40 is driven in the same direction by any known means actuating the screws 35 and 36 but not shown in the drawings.

Figure 6:
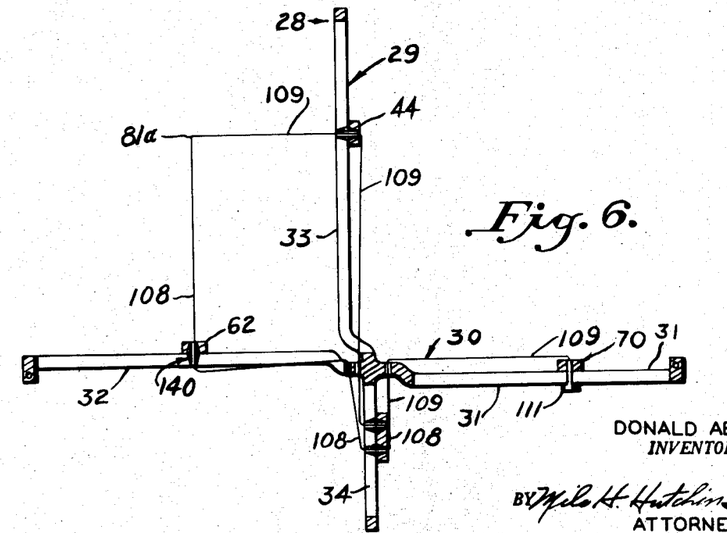
FIGURE 6 is an enlarged sectional view of the main X-carriage along the line 6—6 of FIGURE 1.
Figure 7:
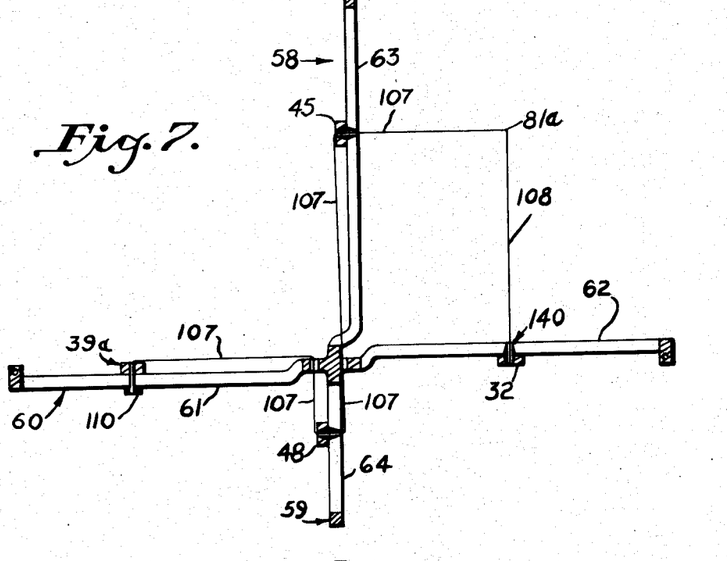
FIGURE 7 is an enlarged sectional view of the main Z-carriage along the line 7—7 of FIGURE 1.

The upper Y-carriage 43 is an L-shaped member constituted of two similar linear members 44 and 45 which are secured together at one end at right angles to each other as illustrated in FIGURE 1. A tapered longitudinal slot 43a (FIG. 1) in the member 44, and a similar slot 45a in the member 45 permit positioning of the later described X, Y, and Z-tension members, 107, 108, and 109, respectively (FIGS. 1, 6, and 7).

The lower Y-carriage 46 (FIG. 1) is substantially similar to the previously illustrated and described upper Y-carriage 43 and is constituted of two linear members 47 and 48 secured together at right angles to each other at corresponding ends. However, the linear member 47 differs from the linear member 48 in that it is substantially twice the width of the member 48 and has two spaced parallel longitudinal slots 47a and 47b rather than the single slot 48a in the linear member 48. Two spaced longitudinal slots are used in the member 47 since two tension members, Y and Z, 108 and 109, respectively, pass through the member 47 as later shown.

Both the upper and lower Y-carriages are held in spaced parallel arrangement with each other and with the horizontal member 30 of the main X-carriage 28 by the vertically spaced Y-screws 49 and 50 which may be threaded through the free ends of the linear members of both the upper and lower Y-carriages, 43 and 46, respectively. The screws 49 and 50 are supported in the top member 22 of the casing 21 by any known bearings 51 and 52, respectively, and in the bottom member 23 by the bearings 53 and 54, respectively. The screws 49 and 50 must have the same constant or variable pitch but not necessarily the same as that of the previously mentioned X-screws 35, 36, and 40. However, the portions of the Y-screws which drive the lower Y-carriage 46 must have twice the pitch of the portions of the screws which drive the upper Y-carriage 43 since the later described Y and Z-tension members, 108 and 109, respectively, are looped through the lower Y-carriage necessitating that the lower Y-carriage travel through one-half the distance of the upper Y-carriage 43. Any known means (not shown) may be used to prevent longitudinal movement of the screws.

The screws 49 and 50 are extended through the bottom member 23, and a sprocket wheel 55 is keyed to the extended end of the screw 50. Another sprocket wheel 55 is keyed to the extended end of the screw 49. A chain drive 57 around the sprocket wheels permits the screws to be rotated simultaneously in the same direction and constitutes the Y-drive.

The main Z-carriage 58 is substantially the same as the previously illustrated and described main X-carriage 28 but the Z-carriage is in a plane perpendicular thereto and also to the plane of the outer X-carriage 39a. The main Z-carriage 58 is constituted of the horizontal member 60 and vertical member 59 which intersect each other intermediate the ends thereof. As in the case of the main X-carriage, the vertical and horizontal members, 59 and 60, respectively, are curved adjacent the line of intersection. One portion 61, the depressed portion, is in a spaced parallel plane relative to the opposite or elevated portion 62. Also, the upper portion 63 of the vertical member 49 is in spaced parallel arrangement with the lower portion 64. As in the case of the main X-carriage, the depressed portion 61 of the horizontal member 60 is substantially equal in length to the elevated portion 62 while the upper portion 63 of the vertical member 59 is substantially twice the length of the lower portion 64. A longitudinal slot 63a is formed in the upper portion 63 and a similar slot 64a in the lower portion 64 of the vertical member 59. Similar slots 61a and 62a are made in the depressed and elevated portions 61 and 62, respectively, of the horizontal member 60. The slots may be tapered to hold the later described anti-friction devices shown in FIGURES 12 and 13.

The main Z-carriage is maintained upright by the spaced parallel Z-screws 65 and 66 which may be threaded through the ends of the horizontal member 60 of the main Z-carriage. The screws 65 and 66 may have a constant or variable pitch but similar to each other. The screw 66 is held in the end members 24 and 25 of the casing 21 by any suitable bearings, and the screw 65 is supported at one end in the end member 25 with the opposite end supported by the bearing 67 in the side member 27. One end of each screw is extended through the end member 25 and on the extended end of the screw 65 is keyed a sprocket wheel 68. A similar sprocket wheel is keyed to the corresponding end of the screw 66 but not shown. A chain drive 69 connects the sprocket wheels for simultaneous movement in either direction and constitutes the Z-drive.

The outer Z-carriage 70 is similar to the previously illustrated and described outer X-carriage, that is it is constituted of a linear member with a longitudinal slot 70a as illustrated. One end of the outer Z-carriage 70 is supported by another screw 71 in spaced parallel arrangement with the Z-screw 66 which also supports one end of the outer Z-carriage, both screws being in the same horizontal plane. Any suitable bearing 72 in the end member 24 of the casing 21 supports one end of the screw 71 while a similar bearing (not shown) in a post 73 supports the opposite end of the screw. The post 73 is secured vertically upright on the bottom member 23 of the casing 21 by any known means. The screw 71 is driven by any known means actuating the screws 65 and 66 but not shown in the drawings.

As shown in FIGURE 1, the outer X-carriage 39a slides on the depressed portion 61 of the horizontal member 60 of the main Z-carriage 58; the elevated portion 62 of the horizontal member 60 of the main Z-carriage 58 slides on the elevated portion 32 of the horizontal member 30 of the main X-carriage 28; and the outer Z-carriage 70 slides on the depressed portion 31 of the horizontal member 30 of the main X-carriage 28. Of course, by this construction the longitudinal slots in the superposed members will coincide.

Figures 2, 2A:
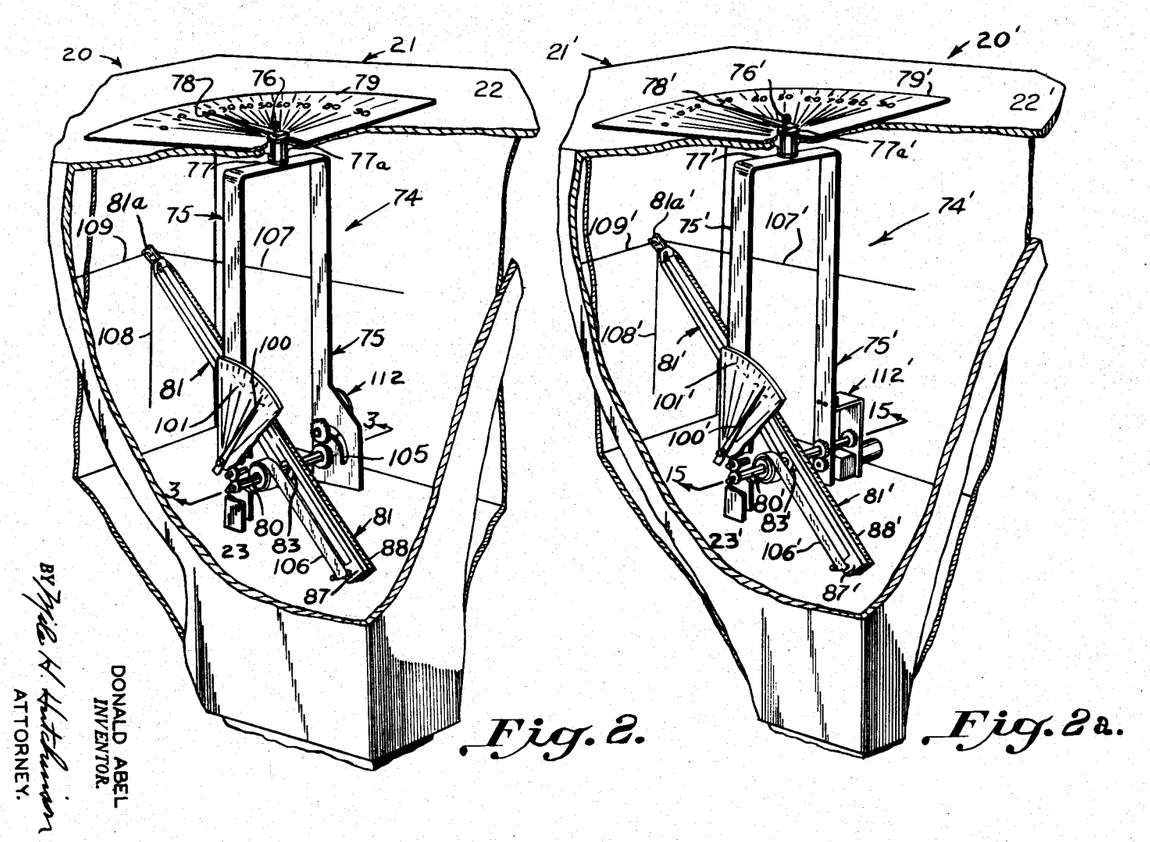
FIGURE 2 is a perspective view of the computer from the opposite side of the casing shown in FIGURE 1, the casing being broken away to show the yoke assembly enlarged and with some of the components shown in FIGURE 1 omitted for clarity.
FIGURE 2a is similar to FIGURE 2 of the first embodiment but differs therefrom in the take-off of the resultant length.

Substantially in the center of the casing 21 is the yoke assembly 74 (FIGS. 1 and 2).

The yoke assembly 74 is constituted in part of an inverted U-member 75 (FIGS. 1 and 2) which is rotatably secured in the top member 22 of the casing 21 by a shaft 76 (FIG. 2) rotatable through the top member 22. The shaft 76 is mounted in any known double bearings 77 (FIG. 2), and held against longitudinal movement by any known hubs removably fixed to the shaft 76 above and below the double bearings but not shown in the drawings. The inner end of the shaft 76 is fixed in the top of the inverted U-member 75 while the outer end protrudes through the top member 22 as illustrated. On the outwardly protruding end of the shaft 76 is keyed a pointer 78 (FIGS. 1 and 2) which moves over a dial 79 divided, for example, into degrees and is the azimuth angle indicator. The shaft 76 could also move the controlling element of a potentiometer, syncro, digital device, etc.

Across the inwardly directed open end of the inverted U-member 75 is the elevation shaft 80 (FIGS. 2 and 3) which passes through the theoretical center of the X, Y, and Z-axes. The elevation shaft 80 rotates in either direction in the inverted U-member 75 and the later described resultant member 81 rotates the elevation shaft 80 when that member is rotated by one or more of the later described X, Y, and Z-tension members.

Figures 2B, 3, 4, 5:
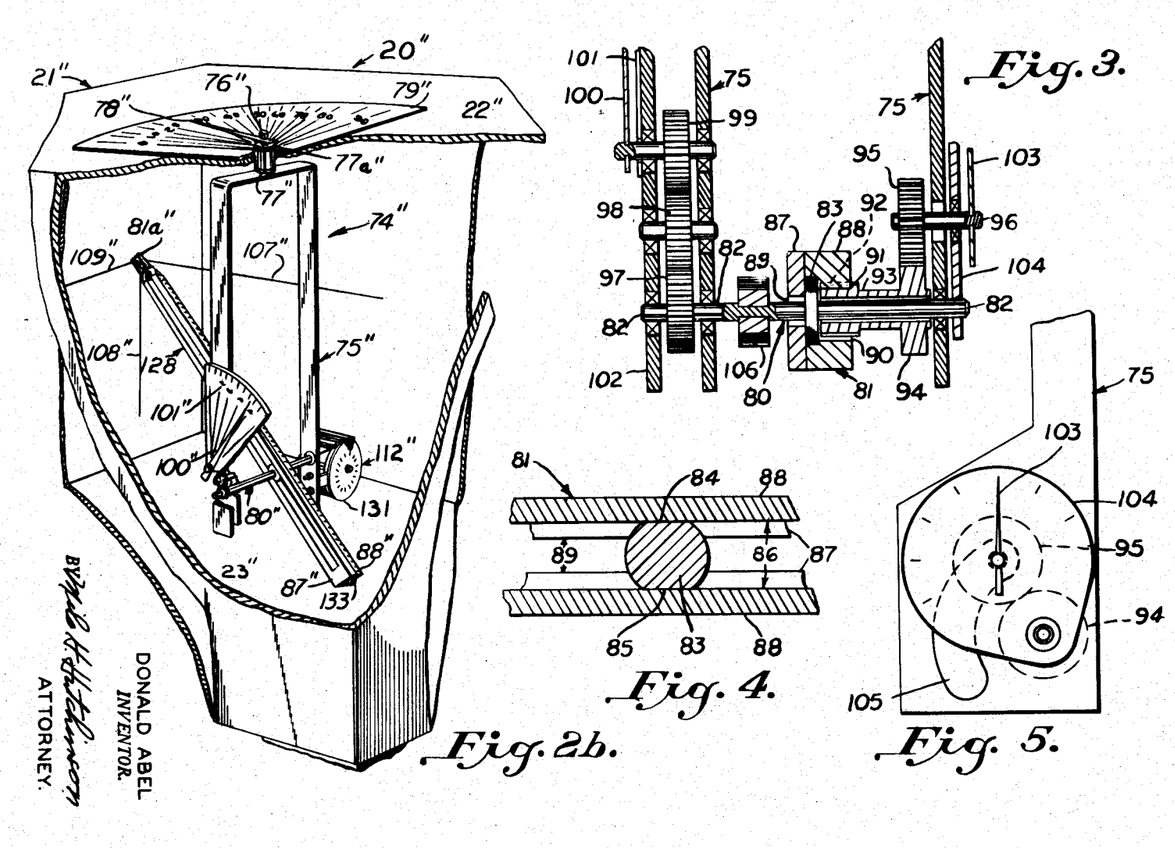
FIGURE 3 is an enlarged sectional view of the lower portion of the yoke assembly along the line 3—3 of FIGURE 2.
FIGURE 4 is an enlarged fragmentary sectional view of the resultant member at the elevation shaft shown in FIGURE 2.
FIGURE 5 is an enlarged fragmentary right side view of the lower portion of the yoke assembly shown in FIGURE 2.
FIGURE 2b is similar to the previously mentioned FIGURES 2 and 2a but differs from each in the take-off of the resultant length.

The elevation shaft 80, as shown in FIGURE 3, is constituted of a shaft 82 rotatable in the inverted U-member 75. A shoulder 83 (FIGS. 3 and 4) fixed to or formed integral with the shaft 82 has two flat surface portions 84 and 85 (FIG. 4) on opposite sides so that the resultant member 81 can move along the shaft 82 while the shoulder 83 with flats 84 and 85, captivated in slot 86, will also rotate the shaft 82.

The resultant member 81 may be formed from two members 87 and 88 secured together in any known manner (FIGS. 2, 3, and 4). A longitudinal slot 89 (FIGS. 3 and 4) is formed in the member 87 and runs for substantially the length thereof. Another slot 86 (FIG. 4) is formed in the member 87 and runs for substantially the length of that member. The surfaces of the slot 86 are parallel to the surfaces of the slot 89 in the member 88. On the opposite side of the member 88 is another slot 90 (FIG. 3). One side of the slot 90 is machined to give clearance for a hollow shaft gear 91 keyed to a hollow shaft 93 (FIG. 3) which is concentric with the shaft 82, the gear 91 engaging a rack 92 machined in the opposite surface of the slot 90. At the opposite end of the hollow shaft 93 (FIG. 3) is another gear 94 keyed thereto and in operable engagement with another gear 95 keyed to a pointer shaft 96 (FIG. 3). A pointer 103 moving over a dial 104 (FIGS. 3 and 5) and keyed to the shaft 96 shows the resultant length.

At the other end of the shaft 82, at the left in FIGURE 3, is a gear train constituted of the gears 97, 98, and 99 with the gear 97 keyed to the shaft 82, and the gear train moving a pointer 100 over the degree dial 101 (FIG. 2) to show the elevation angle. Of course, the gear train 97, 98, and 99 could be eliminated and the pointer 100 fixed directly to the end of shaft 82 dependent upon the space available.

The yoke assembly 74 is rotated to show by pointer 78 (FIGS. 1 and 2) the azimuth angle as follows: Resultant member 81 applies a rotatable force in the X—Z plane which rotates elevation shaft 82 in the same plane because shoulder 83 (FIG. 3) is captivated by resultant member 81. The shaft 82, held by inverted U-member 75, rotates the yoke assembly 74 in azimuth as shown by the pointer 78 on dial 79 (FIGS. 1 and 2).

The hollow shaft gear 91 receives information from the rack 92 as to the resultant length and transfers that information to dial 104. If the rack 92 elevates without changing length, that is swings in an arc, the point of contact of the rack 92 and gear 91 will be the same but will rotate. Thus, the gear 91 subtracts the resultant length and gives an untrue value. To correct this error, the dial 104 is keyed to the shaft 82 and rotates the pointer 103 in the opposite direction. If the gears 94 and 95 have the ratio one to one, the elevation is cancelled out between the pointer 103 and the dial 104. The shaft 96 rotates in the dial 104 and moves in the slot 105 (FIGS. 2 and 5) in the inverted U-member 75 (FIG. 5). When the dial 104 moves the pointer shaft 96, the gear 95 will rotate in position about gear 94 to give a true value for the resultant length.

To keep tension on the following described X, Y, and Z-tension members, a spring member 106 is fixed at one end to the shaft 82 with the opposite end secured in a known manner to the resultant member 81 as shown in FIGURE 2. The opposite end of the spring member 106 moves with the resultant member 81 so that it always exerts a force along the longitudinal axis thereof.

There are three tension members, designated X, Y, and Z, and indicated by numerals 107, 108, and 109, respectively (in FIGURES 1, 2, 6 and/or 7).

The X-tension member 107 (FIGS. 1, 2, and 7), like the following described Y and Z-tension members, may be formed from a substantially strong and flexible wire which at one end is secured to any known slide fastener 110 (FIGS. 1 and 7). The fastener 110 slides in the longitudinal slot 39b (FIG. 1) of the outer X-carriage 39a and also in the slot 61a of the main Z-carriage 58. From the fastener 110, the X-tension member 107 extends along the slot 61a to a point adjacent the intersection of the vertical member 59 with the horizontal member 60 of the main Z-carriage 58, thence downwardly through the depressed portion 61 of the horizontal member 60 to and through the intersection of the slot 48a in the member 48 of the lower Y-carriage 46 with the slot 64a in the lower portion 64 of the vertical member 59 of the main Z-carriage 58, thence upwardly through the elevated portion 62 of the horizontal member 60 of the main Z-carriage 58 and the upper portion 63 of the vertical member 59 of the main Z-carriage 58, thence further upwardly along the slot 63a in the upper portion 63 to a point where the longitudinal slot 45a of the member 45 of the upper Y-carriage 43 coincides with the longitudinal slot 63a, and thence inwardly through the aligned slots 45a and 63a to the top 81a of the resultant member 81.

The Y-tension member 108 (FIGS. 1, 2, 6, and 7) is fastened at one end to another slide fastener 111, similar to the previously mentioned fastener 110. The fastener 111 slides in the longitudinal slots 70a of the outer Z-carriage 70 and 31a of the main X-carriage 28. From the fastener 111, the Y-tension member 108 extends along the longitudinal slot 31a to a point adjacent the intersection of the vertical member 29 with the horizontal member 30 of the main X-carriage 28, thence downwardly through the depressed portion 31 of the horizontal member 30 to and through the intersection of the slot 47b in the member 47 of the lower Y-carriage 46 and the slot 34a in the lower portion 34 of the vertical member 29 of the main X-carriage 28, thence upwardly to and through the elevated portion 32 of the horizontal member 30 of the main X-carriage 28, thence along the slot 32a to a point where the slot 32a in the elevated portion 32 of the horizontal member 30 of the main X-carriage 28 coincides with the slot 62a in the elevated portion 62 of the main Z-carriage 58, and thence upwardly to the top 81a of the resultant member 81.

One end of the Z-tension member 109 (FIGS. 1, 2, and 6) is secured also to the fastener 111 which slides, as previously stated, in the slots 70a of the outer Z-carriage 70 and 31a in the depressed portion 31 of the horizontal member 30 of the main X-carriage 28. From the fastener 111, the Z-tension member 109 extends along the slot 31a to a point adjacent the intersection of the vertical member 29 with the horizontal member 30 of the main X-carriage 28, thence downwardly through the depressed portion 31 of the horizontal member 30 to and through the intersection of the slot 47a in the lower Y-carriage 46 with the slot 34a in the lower portion 34 of the vertical member 29 of the main X-carriage 28, thence upwardly through the elevated portion 32 of the horizontal member 30 of the main X-carriage 28 adjacent the line of intersection and further upwardly along the slot 33a in the upper portion 33 of the vertical member 29 of the main X-carriage 28 to a point where the slot 43a in the member 44 of the upper Y-carriage 43 intersects the slot 33a, and thence inwardly through the intersecting slots 43a and 33a to the top 81a of the resultant member 81.

In order to reduce friction and to maintain the X, Y, and Z-tension members in correct position when passing through the intersecting slots of the carriages, a roller assembly 140 (FIG. 12) is provided. The roller assembly 140 is constituted of two rollers 141 and 142 in which is a bushing 143. The slots in the main X and Z-carriages, and in the upper and lower Y-carriages are tapered as shown in FIGURE 13 which prevents the rollers 141 and 142 from falling therethrough while the bushing 143 prevents the rollers from separating. As the tension members move, the rollers 141 and 142 will rotate in the slots about the bushing 143. A tension member fed through the rollers and bushing will have little or no effect on the operation of the rollers. The roller assembly will apply to any crossover position where a single tension member is involved and in the case of a double tension member the roller assembly is doubled as shown in FIGURE 13. For example, double sets of rollers are used where two tension members 108 and 109 pass through the member 47 of the lower Y-carriage 46 and the lower portion 34 of the vertical member 29 of the main X-carriage 28.

Figure 8:
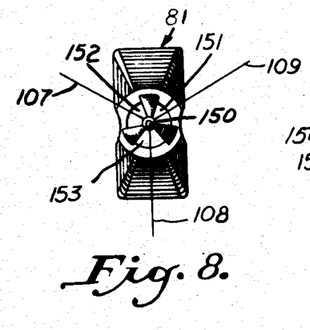
FIGURE 8 is an enlarged top view of the resultant member shown in FIGURES 1 and 2.
Figure 9:
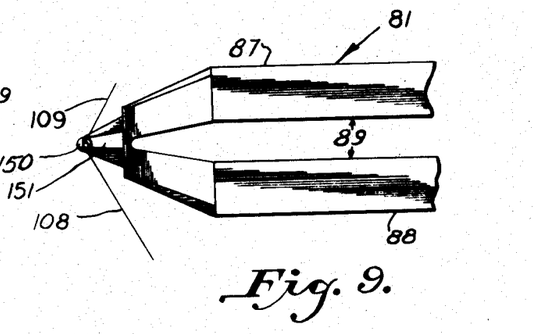
FIGURE 9 is a fragmentary side view of the top of the resultant member shown in FIGURE 8.
Figure 10:
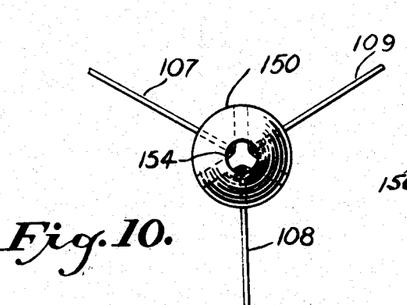
FIGURE 10 is a top view of the ball in the top of the resultant member shown in FIGURE 8.
Figure 11:
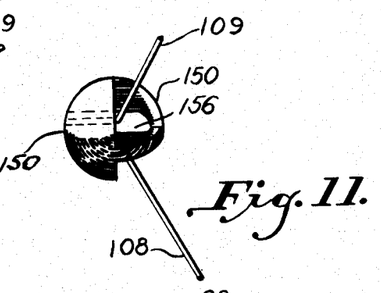
FIGURE 11 is a side view of the ball in the top of the resultant member shown in FIGURE 10.

The free ends of the X, Y, and Z-tension members, 107, 108, and 109, respectively, after being fed through the various carriages in the manner previously illustrated and described, are secured at a theoretical point in the top of the resultant member 81, which point is substantially the intersection of the center lines of the X, Y, and Z-tension members. The theoretical point is in a ball 150 (FIGS. 8-11) which rotates in the top 81a (FIG. 1) of the resultant member 81. For this purpose, the top of the resultant member is outwardly tapered as shown most clearly in FIGURES 8 and 9. In the outwardly tapered end is a circumferential opening or socket. Three spaced openings, one of which is indicated by numeral 156 (FIG. 11), are formed in the inner surface of the ball and communicate with the opening in the top of the ball. Openings 151, 152, and 153 (FIGS. 8 and 9) are formed in the tapered end of the resultant member 81 and register with the openings in the ball. Through each opening in the resultant member and outwardly directed through the registered openings in the ball and the opening 154 (FIG. 10) in the top of the ball is one end of each tension member. Cement or the like may be used to secure the ends of the tension members in the opening 154 of the ball. This construction allows the tension members to keep the same angular relationship with each other without bending, and permits relative movement between the tension members and resultant member which changes for various elevation and azimuth angles.

Figure 15:
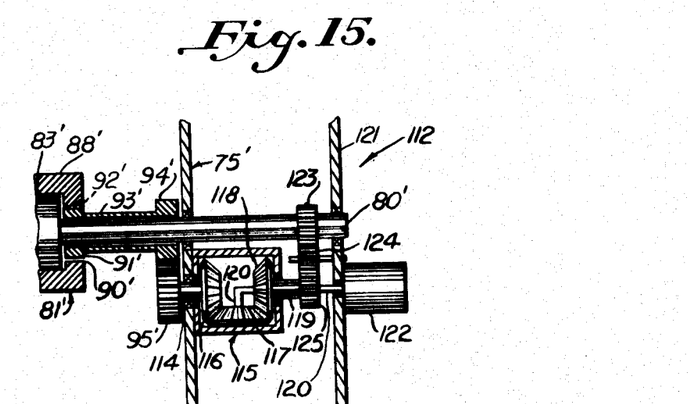

Referring now to the second embodiment of the computer shown in FIGURES 2a and 15, reference numeral 20′ (FIG. 2a) indicates a portion of the computer.

Except for the resultant length take-off, the computer 20′ is identical with the computer 20 of the previously illustrated and described first embodiment. For example, the main and outer X and Z-carriages, the upper and lower Y-carriages, and tension members are omitted at least in part from FIGURE 2a for clarity but are identical with the corresponding components of the first embodiment. The yoke assembly 74′ (FIG. 2a) differs from the corresponding component of the first embodiment only in the take-off for the resultant length. The yoke assembly 74′ is constituted of an inverted U-member 75′ rotatably held in the top member 22′ of the casing 21′ by a shaft 76′, the shaft being held against longitudinal movement by any suitable means not shown in the drawings. On the outwardly protruding end of the shaft 76′ is a pointer 78′ moveable over an azimuth dial 79′.

Rotatably inserted through the open end of the inverted U-member 75′ at the theoretical center of the X, Y, and Z-axes is the elevational shaft 80′. Slidable along and rotating the elevation shaft 80′ is the resultant member 81′.

The resultant member 81′ is identical with the previously illustrated and described resultant member 81 of the first embodiment. For example, two linear members 87′ and 88′, longitudinally slotted as in the first embodiment (FIG. 4) are secured together to captivate a shoulder 83′ (FIG. 15) with opposite flat surface portions for sliding along and rotating the elevation shaft 80′. At the top of the resultant member 81′, one end of each tension member 107′, 108′, and 109′ is fastened in a ball as illustrated and described in the first embodiment.

At the left of the elevation shaft 80' (FIG. 2a) is the elevation angle dial 101' over which the pointer 100' is rotated through the same gear train illustrated in FIGURE 3 of the first embodiment when the elevation shaft 80' is actuated by one or more of the tension members 107', 108', and 109'.

At the right of the elevation shaft 80' (FIG. 15) is the resultant length take-off assembly 112 which corrects for the untrue value of the resultant length from the elevation movement as in the first embodiment. The shoulder 83' with opposite flat surface portions is fixed to or formed integral with the elevation shaft 80' and is captivated in the resultant member as in the first embodiment. From the shoulder, at the right in FIGURES 2a and 15, the elevation shaft 80' extends outwardly and rotatably through one side of the inverted U-member 75' and the bearing plate 121 which is secured to one side of the inverted U-member 75' in any known manner.

A slot 90' formed in the member 88' of the resultant member 81' permits the insertion of the elevation shaft 80' and concentric with the shaft 80' is a hollow shaft 93'. A rack 92' formed in one side of the slot 90' is engaged by the gear 91' keyed to the hollow shaft 93'. At the right of the hollow shaft 93' (FIG. 15) is keyed another gear 94' in operable engagement with a gear 95' which actuates the differential gear assembly 115.

The differential gear assembly 115 is constituted of the gears 116, 117, and 118. The gear 118 is keyed to another hollow shaft 119. Another shaft 120 is rotated by the gear 117 and has a 90 degree bend formed therein for extending outwardly through the hollow shaft 119 and beyond through the bearing plate 121 for actuating the controlling element of a potentiometer 122, syncro, digital device, pointer, etc. moving over any suitable resultant length dial but not shown in the drawings. A gear 123 keyed to the elevation shaft 80' and one of a gear train constituted of gear 124 rotatable in the bearing plate 121 and the gear 125 keyed to the shaft 119, moves the gear 118 of the differential to subtract the movement of shaft 120 as a result of any movement of gear 116 due to the resultant member moving in elevation.

Figures 16, 17:
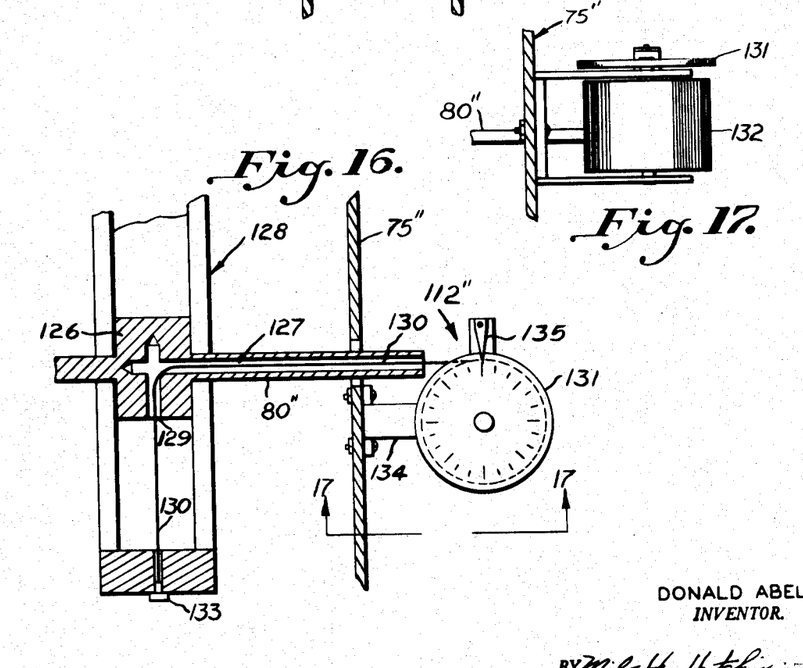
FIGURE 16 is an enlarged view of the resultant length take-off shown in FIGURE 2b.
FIGURE 17 is a sectional view along 17—17 of FIGURE 16.

Referring now to the third embodiment of the computer shown in FIGURES 2b, 16, and 17, reference numeral 20" (FIG. 2b) indicates the computer.

Except for the resultant length take-off and a variation in the resultant member itself, the computer 20" is the same as the computers of the first two embodiments. Thus, the main and outer X and Z-carriages, the upper and lower Y-carriages, and the tension members shown in FIGURE 1 of the first embodiment are the same in this the third embodiment but have been omitted in part from FIGURE 2b for clarity.

The yoke assembly 74" (FIG. 2b) differs from the yoke assembly 74 (FIG. 2) of the first embodiment in the take-off of the resultant length and in the capitivated shoulder 126 (FIG. 16) fixed on or formed with the elevation shaft 80". The yoke assembly 74" is constituted of the inverted U-member 75". A shaft 76" is fixed at one end in the top of the inverted U-member and then extended outwardly and rotatably through the top member 22" of the casing 21". Double bearings 77" may be used and the shaft and assembly prevented from longitudinal movement by any known means not shown in the drawings. On the outwardly extended end of the shaft 76" is a pointer 78" movable over the azimuth dial 79".

The elevation shaft 80" is rotatably inserted through the open end of the inverted U-member 75" at the intersection of the X, Y, and Z-axes. The elevation shaft 80" differs from the like component of the first two embodiments in that it has a longitudinal bore 127 which extends into the shoulder 126 as illustrated, the bore 127 interconnecting with a right angle bore 129 directed toward and through the bottom of the shoulder. Flats (not shown) on the shoulder but similar to the flats illustrated in FIGURE 4 of the first embodiment permit the resultant member to slide along the elevation shaft 80" and also to rotate that member.

A spring loaded drum 132 (FIG. 17) is secured by any suitable bracket 134 to one side of the inverted U-member 75". A flexible wire 130 is fastened at one end to the spring loaded drum 132 and then extended through the bores 127 and 129 with the opposite end of the wire anchored in the bottom of the resultant member by any means 133 (FIG. 16). As the X, Y, and Z-tension members move the resultant member 128, the wire 130 will either be taken up or released by the spring loaded drum 132. The movement of the dial 131 shown by the stationary pointer 135 gives the resultant length. Since the wire 130 comes through the center of the elevation shaft 80", there is no need to correct for elevation movement as in the first two embodiments because there is no rotation of gear point of contact which must be corrected for but only a slight twisting of the wire which neither changes the length thereof nor the dial read out length. Of course, the dial 131 moves with the drum 132. It will be noted that in this the third embodiment there is no spring member like that indicated by numeral 106 of the first embodiment or 106' of the second embodiment since the spring loaded drum 132 of this the third embodiment will accomplish the same result.

In operation.—The X, Y, and Z-input information could be made available to the X, Y, and Z-carriages from a source outside of the casing and other than the sprocket wheels and chain drives illustrated and described. In addition, the actuating means for the main and outer X-carriages, the main and outer Z-carriages, the upper and lower Y-carriages may move independently of each other and at varying speeds. For example, the X-actuating means will move all the X-screen simultaneously in the same direction which produces changes in the positions of the main and outer X-carriages along the theoretical X-axis. The distance between the carriages will always be the same and the distance moved will be limited by the physical size of the casing or, if desired, stops may be provided at extreme positions.

The Y-screws, driven by the Y-actuating means, move the Y-carriages along the theoretical Y-axis. The lower Y-carriage will move one-half the distance of the upper Y-carriage because the thread of the lower portion of the Y-screws has twice the pitch of that of the upper portion. This is necessary because the X, Y, and Z-tension members loop through the lower Y-carriage and take up or give up twice the length of the tension members for any movement thereof.

The Z-screws driven by the Z-actuating means move the main and outer Z-carriages as in the manner of the X-carriages but in planes at ninety degrees to the planes of the X-carriages and along the theoretical Z-axis.

All carriages move adjacent each other and the movements of one do not interfere with the movements of the others. The carriage movements position the X, Y, and Z-tension members and, while all carriages receive the same positioning information, the carriages meter out only specific lengths for individual distances from their respective planes.

The Z-tension member starts at the outer Z-carriage and loops down and through the lower Y-carriage, up and through the upper Y-carriage and thence to the top of the resultant member. The Z-tension member, riding along the main X-carriage, positions the Z-tension member automatically at some point in the X—Y plane. The movement of the main X and upper and lower Y-carriges does this without adding to or subtracting from the length of the Z-tension member since what is given up at the bottom is taken up at the top or what is taken up at the bottom is given up at the top. A feed through length of the Z-tension member from the X—Y plane to the resultant member is solely dependent on the movement of the outer Z-carriage which is driven by the Z-drive.

The Y-tension member also starts at the outer Z-carriage and goes down and through the lower Y-carriage, and thence up and through the main Z-carriage to the resultant member. The Y-tension member is positioned in the X—Z plane by the main X and Z-carriages. The feed through length of the Y-tension member is measured by the loop through the lower Y-carriage which is driven by the Y-drive.

The X-tension member is moved and mounted similarly to the Z-tension member, but the X-tension member is held for positioning in the Y—Z plane by riding the main Z-carriage and being looped through the lower Y-carriage. The feed through distance of the X-tension member is determined by the movement of the outer X-carriage in and out as driven by the X-drive.

As all the carriages move, they will position and meter outer specific lengths of tension members and these three lengths will determine one specific point in space. The tension members are kept at this point by a spring force loaded along the resultant member. As the tension members are moved to new positions, they move the resultant in azimuth, elevation, and length as measured at the origin of the theoretical X, Y, and Z-axes. When swinging in azimuth, the resultant member having captivated the elevation shaft moves the yoke assembly which movement can be used as an azimuth angle indicator. Being captivated in elevation, the resultant member also will rotate the elevation shaft and either directly or through gearing give the elevation angle. Sliding in and out along the elevation shaft by differential gearing and other methods enables a reading of length to be made. Sensors attached to the three areas, that is azimuth angle, elevation angle, and resultant length, provide take-off information.

From the X, Y, and Z-drives through the screws, carriages, tension members, resultant member, and read out mechanism, X, Y, and Z-coordinate information is changed to azimuth angle, elevation angle, and resultant length.

While only three embodiments of subject computer have been illustrated and described, other embodiments are possible within the scope of the appended claims.

What is claimed is:

1. A spherical computer comprising a casing, the casing comprising spaced parallel top and bottom members and end and side members, the members being secured together along corresponding edges, main and outer X and Z and upper and lower Y-carriages disposed in the casing, the main X and Z-carriages comprising a perpendicular and horizontal member intersecting intermediate the ends thereof, the portions of the horizontal member on each side of the perpendicular being substantially of equal length and the portion of the perpendicular above the line of intersection being substantially twice the length of the portion below the line of intersection, the outer X and Z-carriages comprising a linear member substantially equal to one-half the length of the horizontal member of the corresponding main carriage, the upper Y-carriage comprising two linear members secured together at one end at right angles to each other, the lower Y-carriage comprising two linear members secured together at one end at right angles to each other with the width of one linear member substantially greater than the width of the other, each portion of the vertical and horizontal members of the main carriages and the upper and lower Y-carriages and the outer carriages having at least one longitudinal slot formed therein, means maintaining the main X-carriage upright and in spaced parallel arrangement with the outer X-carriage, means maintaining the main Z-carriage upright and in spaced parallel arrangement with the outer Z-carriage and perpendicular to the plane of the main X-carriage, means maintaining the upper and lower Y-carriages in spaced parallel arrangement with each other and perpendicular to the planes of the main X and Z-carriages, the outer X carriage and the most proximate portion of the horizontal member of the main Z-carriage being slidable on each other with the slots communicating, the outer Z-carriage and the most proximate portion of the horizontal member of the main X-carriage being slidable on each other with the slots communicating, the upper Y-carriage and the upper portions of the vertical members of the main X and Z-carriages being slidable on each other with the slots communicating, the lower Y-carriage being slidable on the lower portions of the vertical members of the main X and Z-carriages with the slots communicating, and adjacent portions of the horizontal members of the main X and Z-carriages being slidable on each other with the slots communicating; the computer further comprising a yoke assembly, the assembly comprising an inverted U-member, a shaft fixed at one end in the top of the inverted U-member with the opposite end rotatable through the top member of the casing, a pointer fixed to the end of the shaft through the top member, and an azimuth angle dial for the pointer disposed on the top member; the yoke assembly further comprising an elevation shaft rotatable through the open end of the inverted U-member and passing through the theoretical intersection of the X and Y and Z-axes, the elevation shaft having a shoulder fixed thereon and the shoulder having flat surface portions on opposite sides, a resultant member slidable on the elevation shaft and rotating said shaft, outwardly directed spring tension means for the resultant member, and elevation angle and resultant length indicator means in operable engagement with the elevation shaft; the computer further comprising a slide disposed through the communicating slots of the outer X and main Z-carriages, a second slide disposed through the communicating slots of the outer Z and main X-carriages, X-tension means intermediate the first mentioned slide and the top of the resultant member and passing through communicating slots in the main Z and lower and upper Y-carriages, Z-tension means intermediate the second mentioned slide and the top of the resultant member and passing through communicating slots in the main X and the lower and upper Y-carriages, Y-tension means intermediate the second mentioned slide and the top of the resultant member and passing through communicating slots in the main X and lower Y and main Z-carriages, and anti-friction means for the tension members where passing through communicating slots; the computer further comprising means moving the two X-carriages simultaneously at the same rate in the same direction and the two Z-carriages simultaneously at the same rate in the same direction and the two Y-carriages simultaneously in the same direction with one carriage moving at twice the rate of the other.

2. A spherical computer according to claim 1 in which the perpendicular members of the main X and Z-carriages above and below the line of intersection are in spaced parallel planes and interconnected by a curved portion, and in which the horizontal members of the same carriages on opposite sides of the line of intersection are in spaced parallel planes interconnected by a curved portion.

3. A spherical computer according to claim 1 in which the means maintaining the main and outer X-carriages upright and simultaneously moving said carriages in the same direction comprises three spaced parallel screws, one of the screws being threaded through corresponding ends of the horizontal members of said carriages, a second screw threaded through the opposite end of the horizontal member of the main X-carriage, a third screw threaded through the opposite end of the outer X-carriage, supports and bearings for the screws, and means simultaneously driving the screws at the same rate in the same direction.

4. A spherical computer according to claim 1 in which the means maintaining the upper and lower Y-carriages in spaced parallel planes and simultaneously moving said carriages in the same direction comprises two spaced parallel screws threaded through corresponding ends of the carriages, the thread of each screw through the ends of the lower Y-member having twice the pitch of the screws through the ends of the upper Y-carriage, supports for both screws in the top and bottom members of the casing, and means simultaneously driving the screws in the same direction.

5. A spherical computer according to claim 1 in which the means maintaining the main and outer Z-carriages upright in spaced parallel planes and simultaneously moving the carriages in the same direction comprises three spaced parallel screws, one of the screws being threaded through corresponding ends of the horizontal member of the main and outer Z-carriages, the second screw being threaded through the opposite end of the horizontal member of the main Z-carriage, the third screw being threaded through the free end of the outer Z-carriage, supports and bearings for the screws, and means simultaneously driving the screws in the same direction.

6. A spherical computer according to claim 1 in which the anti-friction means for each tension member when passing through communicating slots of the various carriages comprises a roller assembly, the roller assembly comprising two rollers, means securing each roller in one of the slots and aligned with each other, a bushing disposed intermediate the two rollers, and aligned openings formed through the rollers and bushing for the tension member.

7. A spherical computer according to claim 1 in which the elevation angle indicator means in operable engagement with the elevation shaft comprises a gear fixed to one end of the elvation shaft extended through the adjacent side of the inverted U-member, a second gear in operable engagement with the first mentioned gear, a third gear in operable engagement with the second mentioned gear, shafts for the second and third mentioned gears, support means for at least the shafts of the second and third mentioned gears, the support means being outwardly directed from and in parallel arrangement with the side of the inverted U-member, a pointer fixed to the outwardly directed end of the shaft of the third mentioned gear, and an elevation angle dial fixed to the support with the pointer moving thereover.

8. A spherical computer according to claim 1 in which the resultant member sliding along the elevation shaft and rotating said shaft comprises two linear members, means securing the members together side by side, both members having a transverse slot formed therethrough for the rotatable insertion of the elevation shaft, the second member having a longitudinal slot formed therein on the side of the first member, the slot having substantially the width of the shoulder on the elevation shaft as measured between the flat surface portions thereof and with the transverse bore centered in the slot, the second member further having a second longitudinal slot formed therein on the side opposite the first mentioned slot with the transverse bore centered therein, a rack formed in the upper surface of the second mentioned slot, a hollow shaft concentric with the elevation shaft and extending outwardly from the second mentioned slot, a gear keyed to the end of the hollow shaft in the second mentioned slot and in operable engagement with the rack, a second gear keyed to the opposite end of the hollow shaft, a third gear in operable engagement with the second mentioned gear, a shaft for the third mentioned gear, said shaft being extended through the adjacent side of the inverted U-shaped member, a resultant length dial keyed to the end of the elevation shaft extended through one side of the inverted U-shaped member and rotating said dial adjacent that member, the dial being slotted for the rotatable insertion of the shaft of the third mentioned gear in any position of the dial, and a pointer keyed to the outer end of the shaft of the third mentioned gear and movable over the outer surface of the dial.

9. A spherical computer according to claim 1 in which the resultant member sliding along the elevation shaft and rotating said shaft comprises two linear members, means securing the members together side by side, both members having a transverse bore formed therethrough for the rotatable insertion of the elevation shaft, the second member having a longitudinal slot formed therein on the side of the first member, the slot having substantially the width of the shoulder on the elevation shaft as measured between the flat surface portions thereof and with the transverse bore centered in the slot, the second member further having a second longitudinal slot formed therein on the side opposite the first mentioned slot with the transverse bore centered in the slot, a rack formed in the upper surface of the second mentioned slot, a hollow shaft concentric with the elevation shaft and extending outwardly from the second mentioned slot, a gear keyed to the end of the hollow shaft in the second mentioned slot and in operable engagement with the rack, a second gear keyed to the opposite end of the hollow shaft, a third gear in operable engagement with the second mentioned gear, a shaft for said gear, the shaft extending through the adjacent side of the inverted U-shaped member, a fourth gear keyed to the extended end of the shaft, a fifth gear in operable engagement with the fourth mentioned gear and in a plane perpendicular to the plane thereof, a sixth gear in operable engagement with the fifth mentioned gear and in a plane perpendicular to the plane thereof, a second hollow shaft for the sixth mentioned gear and extended outwardly therefrom, a seventh gear keyed to the free end of the second hollow shaft, a second shaft for the fifth mentioned gear, the second shaft being inwardly and thence outwardly directed through the second mentioned hollow shaft and extended beyond, a sensing element keyed to the extended end of the second mentioned shaft, an eighth gear keyed to the outwardly extended end of the elevation shaft, a ninth gear in operable engagement with the seventh and eighth mentioned gears, and support means for the ninth mentioned gear.

10. A spherical computer according to claim 1 in which the resultant member sliding along the elevation shaft and rotating said shaft comprises two linear members, means securing the members together in spaced parallel arrangement at a distance substantially equal to the perpendicular distance between the flat surface portions on the shoulder of the elevation shaft, the resultant member sliding along the elevation shaft and rotating the elevation shaft, the shaft at one end having a longitudinal bore formed therein with the bore extended into the shoulder, a second bore formed in the shoulder, the second bore at one end communicating with the first mentioned bore and extending downwardly through the shoulder, a spring loaded drum disposed on the inverted U-shaped member on the side of the longitudinal bore in the elevation shaft, a flexible wire secured at one end to the drum with the free end extended first through the longitudinal bore and thence downwardly through the second mentioned bore, means securing the free end of the wire in the downwardly directed end of the resultant member, and a pointer fixed to the inverted U-shaped member with the drum rotating thereunder.

11. A spherical computer according to claim 1 in which the upwardly directed end of the resultant member is inwardly tapered with a circumferential opening formed in the outer end, a ball rotatable in the circumferential opening, the ball having three spaced openings formed in the inner surface of the ball and communicating with another circumferential opening in the top of the ball, the tapered end of the resultant member further having openings aligned with the openings in the inner surface of the ball, and means securing one end of each tension member in the aligned openings.

No references cited.

UNITED STATES PATENT OFFICE
CERTIFICATE OF CORRECTION

Patent No. 3,002,679            October 3, 1961

Donald Abel

It is hereby certified that error appears in the above numbered patent requiring correction and that the said Letters Patent should read as corrected below.

Column 10, line 38, for "X-screen" read -- X-screws --.

Signed and sealed this 3rd day of April 1962.

(SEAL)
Attest:

ERNEST W. SWIDER            DAVID L. LADD
Attesting Officer            Commissioner of Patents